(12) United States Patent
Nooshabadi et al.

(10) Patent No.: US 12,400,448 B2
(45) Date of Patent: Aug. 26, 2025

(54) SYSTEMS AND METHODS FOR A STEP AND SCAN DETECTION NETWORK FOR HITCHBALL LOCATION ESTIMATION

(71) Applicant: Ford Global Technologies, LLC, Dearborn, MI (US)

(72) Inventors: Saeid Nooshabadi, Gilroy, CA (US); Yongbo Qian, San Jose, CA (US); Vijay Nagasamy, Fremont, CA (US); Gurjeet Singh, Castro Valley, CA (US); Manan Sanjay Patel, Canton, MI (US); Ali Mustafa, Dearborn, MI (US)

(*) Notice: Subject to any disclaimer, the term of this patent is extended or adjusted under 35 U.S.C. 154(b) by 487 days.

(21) Appl. No.: 17/649,747

(22) Filed: Feb. 2, 2022

(65) Prior Publication Data
US 2023/0245453 A1    Aug. 3, 2023

(51) Int. Cl.
| | |
|---|---|
| G06V 20/40 | (2022.01) |
| B60R 1/00 | (2022.01) |
| B60R 1/26 | (2022.01) |
| B60R 11/04 | (2006.01) |
| G06V 10/25 | (2022.01) |

(Continued)

(52) U.S. Cl.
CPC .............. *G06V 20/46* (2022.01); *B60R 1/003* (2013.01); *B60R 1/26* (2022.01); *B60R 11/04* (2013.01); *G06V 10/25* (2022.01); *G06V 10/82* (2022.01); *G06V 20/56* (2022.01); *B60R 2300/806* (2013.01)

(58) Field of Classification Search
CPC ........... B60R 1/003; B60R 1/26; B60R 11/04; B60R 2300/80; B60R 2300/06; B60R 1/23; B60R 2300/304; B60D 1/248; B60D 1/00; B60D 1/01; B60D 1/06; B62D 25/209; G06V 20/56; G06V 10/25; G06V 10/255; G06V 10/82; G06V 20/46; G06V 20/70; G06V 20/41; G06N 3/09
See application file for complete search history.

(56) References Cited

U.S. PATENT DOCUMENTS

| | | | |
|---|---|---|---|
| 9,499,018 B2* | 11/2016 | Gehrke | ................. B60R 1/003 |
| 9,696,723 B2 | 7/2017 | Zeng et al. | |
| 9,731,568 B2 | 8/2017 | Wuergler et al. | |

(Continued)

OTHER PUBLICATIONS

Rosebrock. "Turning any CNN image classifier into an object detector with Keras, TensorFlow, and OpenCV," pyimagesearch [retrieved Jun. 22, 2020]. Retrieved from Internet <URL: https://pyimagesearch.com/2020/06/22/turning-any-cnn-image-classifier-into-an-object-detector-with-keras-tensorflow-and-opencv/> (Year: 2020).*

(Continued)

*Primary Examiner* — Emily C Terrell
*Assistant Examiner* — Julia Z. Yao
(74) *Attorney, Agent, or Firm* — Frank Lollo; Eversheds Sutherland (US) LLP (57) ABSTRACT

Systems and methods for estimation of vehicle hitchball location are disclosed. A plurality of image frames may be received from a rear-facing camera of a vehicle. The rear-facing camera may be directed at a front of a trailer that is coupled to the vehicle at a hitchball. An approximate lateral location of the hitchball coupled to the vehicle may be determined by obtaining a plurality of cropped images along a hitch drawbar coupled to the vehicle by stepping along the vertical direction, and performing a stepwise lateral scan, centered at the hitch drawbar.

15 Claims, 4 Drawing Sheets

(51) Int. Cl.
    *G06V 10/82* (2022.01)
    *G06V 20/56* (2022.01)

(56) References Cited

U.S. PATENT DOCUMENTS

| | | | |
|---|---|---|---|
| 10,155,478 B2 * | 12/2018 | Hu | G06T 7/74 |
| 10,987,984 B2 | 4/2021 | Carpenter | |
| 11,050,933 B2 * | 6/2021 | Chen | B60D 1/36 |
| 11,676,300 B2 * | 6/2023 | Ramirez Llanos | G06V 20/56 382/103 |
| 2018/0081370 A1 * | 3/2018 | Miller | B60W 10/04 |
| 2019/0086927 A1 | 3/2019 | Skvarce | |
| 2020/0079165 A1 * | 3/2020 | Niewiadomski | G05D 1/0246 |
| 2020/0097021 A1 | 3/2020 | Carpenter et al. | |
| 2020/0130582 A1 * | 4/2020 | Wong | B62D 13/06 |
| 2020/0282910 A1 * | 9/2020 | Nagasamy | B60D 1/62 |
| 2020/0324593 A1 * | 10/2020 | Niewiadomski | B62D 15/027 |
| 2021/0034903 A1 * | 2/2021 | Daga | G06V 10/7747 |
| 2022/0024391 A1 * | 1/2022 | Gali | G06T 7/73 |
| 2022/0084212 A1 * | 3/2022 | Dahal | G06N 3/08 |

OTHER PUBLICATIONS

Atoum et al., "Monocular Video-Based Trailer Coupler Detection Using Multiplexer Convolutional Neural Network," 2017 IEEE International Conference on Computer Vision (ICCV), Venice, Italy, 2017, pp. 5478-5486, doi: 10.1109/ICCV.2017.584. (Year: 2017).*

Ashok Dahal et al., DEEPTRAILERASSIST: Deep Learning Based Trailer Detection, Tracking and Articulation Angle Estimation on Automotive Rear-View Camera, IEEE/CFV International Conference on Computer Vision Workshop, 2019.

Yousef Atoum et al., Monocular Video-Based Trailer Coupler Detection Using Multiplexer Convolutional Neural Network, Michigan State University and General Motors.

* cited by examiner

SYSTEMS AND METHODS FOR A STEP AND SCAN DETECTION NETWORK FOR HITCHBALL LOCATION ESTIMATION

BACKGROUND

Despite significant developmental efforts in automation, driver assisted features for maneuvering with a trailer call for accurate estimations of the location of a hitchball. The location of the hitchball is important for trailer angle detection (TAD) and other driver assist features for maneuvering a vehicle with a trailer, such as backup assistance.

It is desirable to provide solutions that provide hitchball position information and associated hitch angle information after a vehicle is hitched to a trailer.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, this disclosure is generally directed to systems and methods for estimation of vehicle hitchball location. In one example embodiment, a plurality of image frames may be received from a rear-facing camera of a vehicle. The rear-facing camera may be directed at a front of a trailer that is coupled to the vehicle at a hitchball. An approximate lateral location of the hitchball coupled to the vehicle may be determined by obtaining a plurality of cropped images along a hitch drawbar coupled to the vehicle by stepping along the vertical direction, and performing a stepwise lateral scan, centered at the hitch drawbar. At each vertical step, during the stepwise lateral scan, the plurality of cropped images may be fed into a neural network to process each cropped image to detect the hitchball therein. The lateral scan may be repeated for several vertical steps, until a predetermined percentage of the processed cropped images in the lateral scan detect the hitchball therein. The predetermined percentage of cropped images may be optimized by repeating the procedure multiple times to enable a vote by the neural network.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternative implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

It should also be understood that the word "example" as used herein is intended to be non-exclusionary and non-limiting in nature. Furthermore, certain words and phrases that are used herein should be interpreted as referring to various objects and actions that are generally understood in various forms and equivalencies by persons of ordinary skill in the art. For example, the word "application" or the phrase "software application" as used herein with respect to a mobile device such as a smartphone, refers to code (software code, typically) that is installed in the mobile device. The code may be launched and operated via a human machine interface (HMI) such as a touchscreen. The word "action" may be used interchangeably with words such as "operation" and "maneuver" in the disclosure. The word "maneuvering" may be used interchangeably with the word "controlling" in some instances. The word "vehicle" as used in this disclosure can pertain to any one of various types of vehicles such as cars, vans, sports utility vehicles, trucks, electric vehicles, gasoline vehicles, hybrid vehicles, and autonomous vehicles. Phrases such as "automated vehicle," "autonomous vehicle," and "partially-autonomous vehicle" as used in this disclosure generally refer to a vehicle that can perform at least some operations without a driver being seated in the vehicle.

Figure 1:
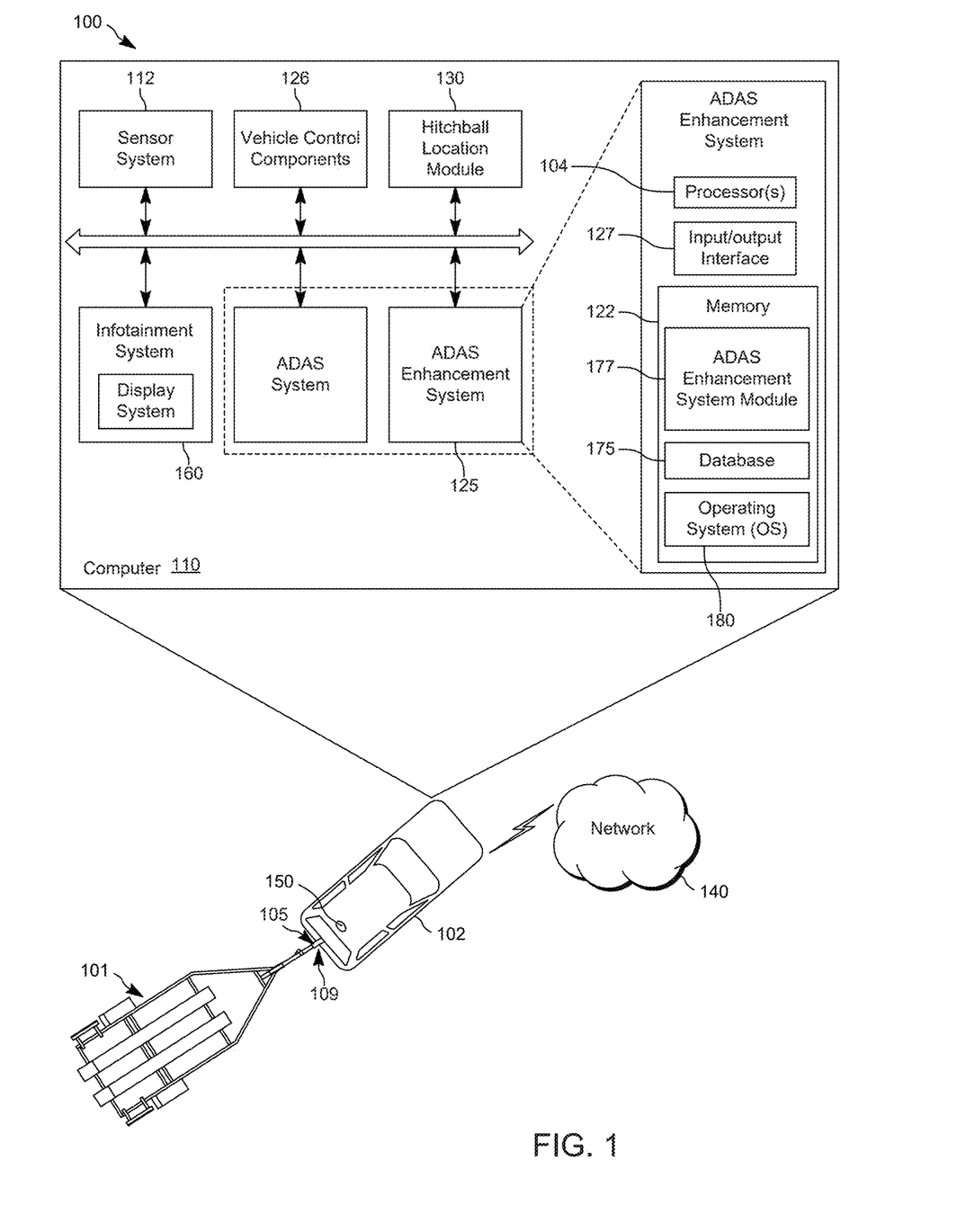
FIG. 1 illustrates an example system that includes a vehicle configured with a trailer hitch and camera in accordance with an embodiment of the disclosure.

FIG. 1 illustrates an example system 100 that includes a trailer 101 hitched to a vehicle 102 in accordance with an embodiment of the disclosure. Trailer 101 may be coupled to vehicle 102 via a hitchball. The vehicle 102 may be one of various types of vehicles with a chassis and may be a gasoline powered vehicle, an electric vehicle, a hybrid electric vehicle, or an autonomous vehicle, all of which may be configured as an automated or semi-automated vehicle. The system 100 may be implemented in a variety of ways and can include various types of devices. For example, the example system 100 can include some components that are a part of the vehicle 102. The components that can be a part of the vehicle 102 can include a vehicle on-board computer 110, and a sensor system 112 coupled to cameras, such as backup camera or rear-facing camera 150 coupled to the vehicle 102. Thus, on-board computer 110 may be coupled to vehicle 102 chassis, the on-board computer including at least a memory and a processor, such as memory 122 and processor 104 coupled to the memory, wherein the processor 104 is configured to determine where a hitchball is coupled to a trailer connected vehicle 102.

The vehicle on-board computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.), among other functions.

The vehicle computer on-board 110, in one or more embodiments, may be used to support features such as passive keyless operations, remotely-controlled vehicle maneuvering operations, and remote vehicle monitoring operations. Vehicle on-board computer 110 may further control some maneuvers performed by the vehicle 102 during the self-parking operation (referred to in the industry as a Remote Park Assist (RePA) operation) as well as other operations such as a trailer-hitch assist operation (referred to in the industry as a Remote Trailer Hitch Assist (ReTHA) operation) and a trailer maneuvering assist operation (referred to in the industry as a Remote Trailer Maneuver Assist (ReTMA) operation). Some of the features available regarding hitch assist and maneuvering assist call for knowledge of the location of the hitchball 109 after the hitchball 109 is attached to a hitch and no longer visible. For example, if a driver manually attaches a trailer to the hitchball 109 and then uses trailer maneuvering assistance operations, the location of the hitchball is needed. In such cases, vehicle on-board computer 110 may execute certain operations associated with locating the hitchball 109 where a hitchball couples to a trailer, such as trailer 101.

The vehicle on-board computer 110 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in a blind spot, etc.). In one or more embodiments, vehicle on-board computer 110 may enable a self-driving car or provide driver assistance. Thus, vehicle on-board computer 110 may further include an Advanced Driver-Assistance System ("ADAS") enhancement system 125. which is shown to further include, as one embodiment, the various components of the vehicle 102 that may be controlled, activated, and/or operated by the vehicle by the ADAS enhancement system 125. In one implementation, the ADAS enhancement system 125 can be an independent device (enclosed in an enclosure, for example). In another implementation, some or all components of the ADAS enhancement system 125 can be housed, merged, or can share functionality, with vehicle on-board computer 110. For example, an integrated unit that combines the functionality of the ADAS enhancement system 125 can be operated by a single processor and a single memory device. In the illustrated example configuration, the ADAS enhancement system 125 includes the processor 104, an input/output interface 127, and memory 122, ADAS Enhancement System Module 177, database 175 and operating system 180. The input/output interface 127 is configured to provide communications between the ADAS enhancement system 125 and other components such as the sensors 150, the vehicle control components 126 and any infotainment system 160, if present. The memory 122, which is one example of a non-transitory computer-readable medium, may be used to store an operating system (OS) 180, a database 175, and various code modules such as an ADAS enhancement system module 177. The modules, including ADAS enhancement system module 177, may be provided in the form of computer-executable instructions that can be executed by processor 104 for performing various operations in accordance with the disclosure.

In one or more embodiments, communications network 140 includes a cellular or Wi-Fi communication link enabling vehicle 102 to communicate with network 140, which may include a cloud-based network or source for transferring data in accordance with this disclosure.

Vehicle 102 rear-facing camera 150 may further include a set of nodes and/or sensors such as radars mounted upon vehicle 102 in a manner that allows the vehicle on-board computer 110 to communicate with devices and collect data for locating a hitchball and hitch drawbar 105. Examples of may include sensors, radars and/or emitters capable of detecting objects, distances such as ultrasonic radar, LiDAR, cameras, including back-up cameras and the like. In one or more embodiments, sensors/cameras may further include one or more of Bluetooth®-enabled sensors, or Bluetooth® low energy (BLE)-enabled sensors. In one embodiment, a single node and/or sensor and/or backup camera 150 may be mounted at the rear of the vehicle 102 as a back-up camera or radar. Other sensors may also be present in vehicle 102 including wheel speed sensors, accelerometers, rate sensors, GPS sensors, and steering wheel sensors.

Vehicle on-board computer 110 includes hitchball location module 130 to perform hitchball location by collecting data from rear-facing camera 150 on vehicle 102 or other sensors directed at the hitchball location 109. Vehicle on-board computer 110 further may control vehicle 102 using some maneuvers performed by the vehicle 102 during the self-parking operation (referred to in the industry as a Remote Park Assist (RePA) operation) as well as other operations such as a trailer-hitch assist operation (referred to in the industry as a Remote Trailer Hitch Assist (ReTHA) operation) and a trailer maneuvering assist operation (referred to in the industry as a Remote Trailer Maneuver Assist (ReTMA) operation).

Figure 2:
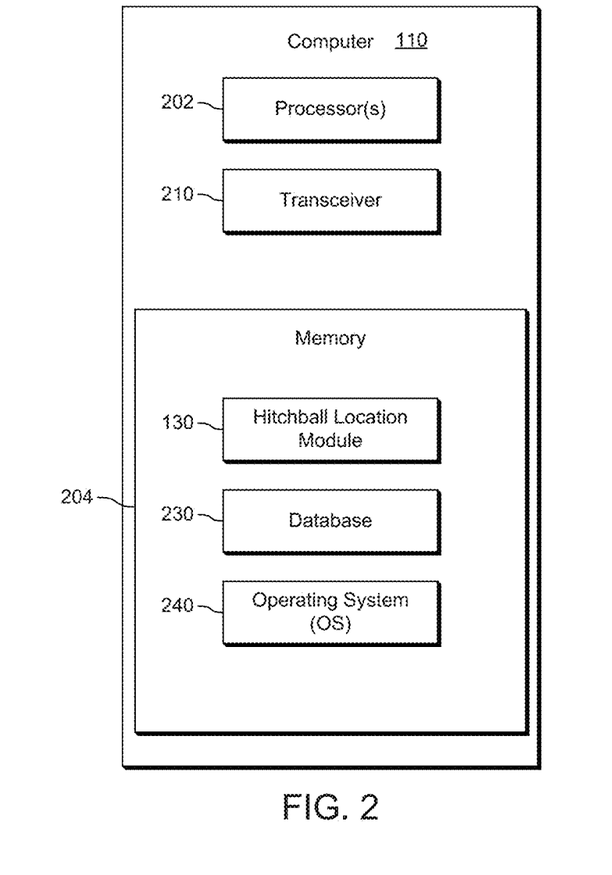
FIG. 2 illustrates some example functional blocks that may be included in a system for a vehicle in accordance with an embodiment of the disclosure.

Referring to FIG. 2, vehicle on-board computer 110 is shown configured to execute various operations associated with estimating the location of a hitchball via hitchball location module 130 in accordance with one or more embodiments.

As shown, in one embodiment, on-board computer 110 includes components such as processor 202 and memory 204, which is one example of a non-transitory computer-readable medium, may be used to store the operating system (OS) 240, database 230, and various modules, such as hitchball module 130. One or more modules in the form of computer-executable instructions may be executed by the processor 210 for performing various operations in accordance with the disclosure. More particularly, hitchball location module 130 may be executed by the processor 202 in accordance with the disclosure for determining the location of hitchball 109 which identifies the location of a hitchball for connecting vehicle 102 to a trailer.

Referring back to FIG. 1, trailer 101 and vehicle 102 are shown in a hitched position. According to an embodiment, hitchball location is determined while trailer 101 is connected, and either stationary or moving. More specifically, according to embodiments, a neural network receives a plurality of images or videos from at least a rear-facing camera on vehicle 102 and determines the hitchball location.

As shown on FIG. 1, sensors coupled to vehicle 102 include rear-facing camera(s) 150. In one or more embodiments, the data received by rear-facing camera 150 may be provided to hitchball location module 130 to determine a hitchball location after vehicle 102 and trailer 101 are coupled, stationary or moving.

Figure 3:
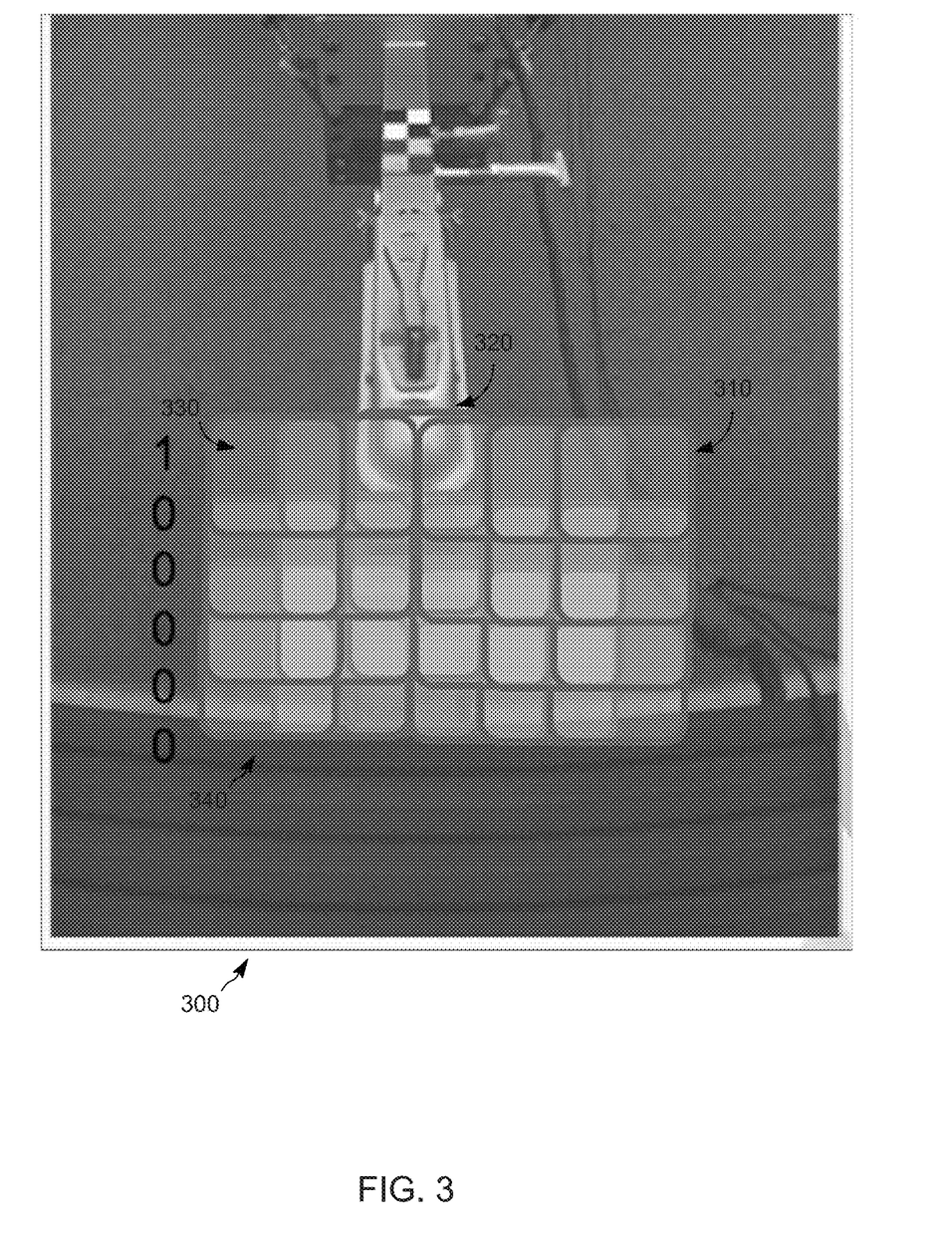
FIG. 3. illustrates an image from a rear facing camera of a tow vehicle with a lateral stepwise scan overlaying the image in accordance with an embodiment of the disclosure.

Referring now to FIG. 3, an image 300 from rear-facing camera 150 is shown with an overlay 310 of six lateral scans, over a predetermined location of drawbar 105 coupled to a hitch 320 covering a hitchball. As shown, each of the lateral scans from left to right are identified with a zero "0" where no recognizable hitchball indication is found at a predetermined number of crops. On the other hand, the top lateral scan 330 is identified with a one "1" as an indication of a hitchball is found, at a predetermined number of crops.

As shown, at a vertical step, each lateral scan proceeds along a strip identified by the width of the scans. For each image 300 an analysis is performed along two dimensions in a stepwise manner to create a plurality of cropped images. At each vertical step, each lateral scan shows multiple steps with cropped images 340. In one embodiment, overlay 310 is a 64 by 64 pixel template with the number of vertical and lateral steps and image crops being determined according to system requirements.

In one or more embodiments, image 300 is exemplary of multiple images or videos received at hitchball location module 130. For example, a lateral scan of the 64 by 64 pixel template, or any other size, can represent a region of interest in an area in which hitchball 109 is known to exist. Thus, location module 130 may perform neural network processing including performing a lateral scan with a stepwise probability calculation of the region of interest.

In one or more embodiments, the location module 130 may perform artificial intelligence algorithms or the like as will be appreciated by one of ordinary skill in the art with the benefit of this disclosure. Thus, the stepwise probability calculation applies artificial intelligence of a known shape of the hitchball to recognize one or more cropped images that include the hitchball. The stepwise probability calculation includes data of a known shape of the hitchball to recognize one or more cropped images that include the hitchball. The known shape may include information stored, and the hitchball location information may include partial information stored from vehicle manufacturing information. Due to the inconsistencies in manufacturing, however, stored manufacturing partial information may not be accurate, and there is a need for verification. The stored manufacturing partial information, however, only apply to the lateral location of the hitchball which is expected to be fixed. The longitudinal location of the hitchball depends on the particular hitch assembly employed and needs to be discovered in the field.

In one or more embodiments, the stepwise probability calculation includes reviewing each cropped image in each lateral scan at a fixed step size, and scanning at each step to determine likelihood of the presence of the hitchball. This lateral scanning and stepwise probability calculation may be repeated at multiple vertical locations until a predetermined percentage of cropped images including the hitchball are detected. The number of repeats can be determined according to the type of vehicle involved and the type of camera being used. For example, if a high definition camera or video camera 150 is used, fewer repetitions may be needed.

In one or more embodiments, performing the lateral scan may include scanning or collecting pairs of cropped images such that each pair includes a positive cropped image including the hitchball and a negative cropped image situated below or/and above the positive cropped image with no visible hitchball. Such image pairs may be used to train a neural network. For example, a neural network may be trained offline or over a network 140. Such training could include deep-learning based object detection and/or computer-vision based detection. For example, the 64 by 64 pixel template, or any other size, 310 applied to each image frame 300 may be used for training a neural network using the image pairs and step and scan location techniques described herein.

Figure 4:
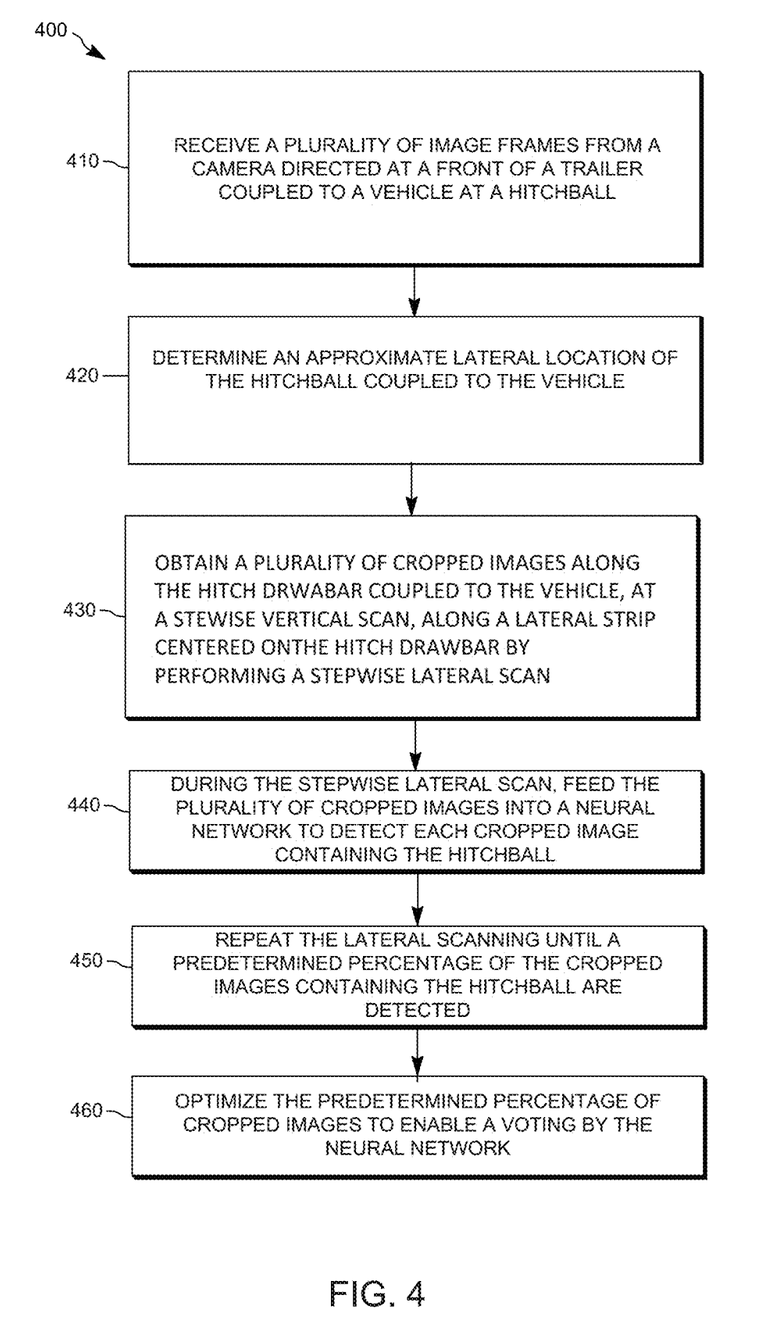
FIG. 4 illustrates a flow diagram of a method in accordance with an embodiment of the disclosure.

Referring now to FIG. 4, a flow diagram 400 illustrates a method in accordance with an embodiment. As shown block 410 provides for receiving a plurality of image frames from a camera directed at a front of a trailer coupled to a vehicle at a hitchball. For example, network 140 or computer 110 may receive image frames from camera 150 located on vehicle 102 coupled to trailer 101. As shown in FIG. 3, image 300 may represent one of the image frames received from camera 150.

Block 420 provides for determining an approximate lateral location of the hitchball coupled to the vehicle. For example, determining an approximate lateral location may include receiving data identifying the location of drawbar 105 coupled to vehicle 102 and use the location of the drawbar 105 holding a hitchball 109 as the approximate lateral location.

Block 430 provides for obtaining a plurality of cropped images, at stepwise vertical location, along a hitch drawbar coupled to the vehicle, along a lateral strip centered at the hitch drawbar by performing a stepwise lateral scan. For example, using camera 150, images or video along the located hitch drawbar 105 may be analyzed to provide a plurality of cropped images to enable input to a neural network.

Block 440 provides that during the stepwise lateral scan, feeding the plurality of cropped images into a neural network to detect each cropped image that includes the hitchball. For example, the 64 by 64 template or any other size, 310 may be used to perform the lateral scan and feed into a neural network using hitchball location module 130.

Block 450 provides for repeating the lateral scanning until a predetermined percentage of the cropped images that include the hitchball are detected. For example, if a higher percentage of cropped images contains the hitchball, further repetition at a different vertical location, may not be necessary. In one or more embodiments, the repeating can be until a confidence level or artificial intelligence determines that the hitchball is located sufficiently to enable other vehicle maneuvers or enable further driver assistance modules within a towing vehicle.

Block 460 provides for optimizing the predetermined percentage of cropped images to enable a voting by the neural network. For example, in one or more embodiments, a neural network involves voting to determine whether a hitchball is properly located. That is, the neural network may combine the outputs of a set of neural network classifiers to reach a combined decision. The methods may range from the requirement of a complete agreement to schemes based on the distribution of votes collected. Any number of voting schemes may be used by the neural network.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, mobile devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
    receiving a plurality of image frames from a camera directed at a front of a trailer coupled to a vehicle at a hitchball, wherein the hitchball is attached to the trailer covered by a hitch of the trailer;
    receiving data indicating a location of a hitch drawbar coupled to the vehicle and data indicating a lateral location of the hitchball from vehicle manufacturing information, wherein the vehicle manufacturing information is used only for the lateral location of the hitchball;
    determining a lateral location of the hitchball coupled to the vehicle based on the data indicating the location of the hitch drawbar;
    performing a stepwise lateral scan of only a region of interest based on a template centered at the lateral location of the hitchball from the vehicle manufacturing information, the stepwise lateral scan comprising obtaining a plurality of cropped images in a longitudinal direction along the hitch drawbar at a vertical step;
    during the stepwise lateral scan, feeding the plurality of cropped images into a neural network to detect each cropped image in the plurality of cropped images that includes the hitchball;
    repeating the stepwise lateral scan until a predetermined percentage of the cropped images in the plurality of cropped images that include the hitchball are detected;
    optimizing the predetermined percentage of the cropped images in the plurality of cropped images that include the hitchball to enable a voting by the neural network; and
    automatically performing, by the vehicle, a self-parking operation using the voting by the neural network indicating a location of the hitchball.

2. The method of claim 1, wherein the neural network includes a deep-learning based object detection and computer-vision based detection within the template on each of the plurality of image frames received from the camera directed at the front of the trailer.

3. The method of claim 1, wherein the stepwise lateral scan includes a stepwise probability calculation of the region of interest.

4. The method of claim 3, wherein the stepwise probability calculation includes recognizing one or more of the cropped images in the plurality of cropped images that include the hitchball by applying artificial intelligence of a known shape of the hitchball.

5. The method of claim 3, wherein the stepwise probability calculation includes recognizing one or more of the cropped images in the plurality of cropped images that include the hitchball by including data of a known shape of the hitchball.

6. The method of claim 3, wherein the stepwise probability calculation is a fixed step of any size over the stepwise lateral scan.

7. The method of claim 1, wherein the repeating the stepwise lateral scan until the predetermined percentage of the cropped images in the plurality of cropped images that include the hitchball are detected includes lateral scanning of the plurality of image frames received from the camera directed at the front of the trailer.

8. The method of claim 1, wherein, in multiple vertical steps, the performing the stepwise lateral scan of each of the plurality of cropped images along the hitch drawbar further includes:
    collecting pairs of cropped images, each pair including a positive cropped image including the hitchball which is also shifted laterally stepwise to increase a number of positive cropped images including the hitchball, and at least one negative cropped image beneath and/or above the positive cropped image with no visible hitchball within a region of interest of any size.

9. The method of claim 8, wherein the pairs of cropped images are used to train the neural network offline.

10. A system for a vehicle, comprising:
    a memory that stores computer-executable instructions;
    a processor configured to access the memory and execute the computer-executable instructions to:
        receive a plurality of image frames from a camera directed at a front of a trailer coupled to a vehicle at a hitchball, wherein the hitchball is attached to the trailer and is no longer visible;
        receive data indicating a location of a hitch drawbar coupled to the vehicle and data indicating a lateral location of the hitchball from vehicle manufacturing information, wherein the vehicle manufacturing information is used only for the lateral location of the hitchball;
        determine a lateral location of the hitchball coupled to the vehicle based on the data indicating the location of the hitch drawbar;
        perform a stepwise lateral scan of only a region of interest based on a template centered at the lateral location of the hitchball from the vehicle manufacturing information, the stepwise lateral scan comprising obtaining a plurality of cropped images in a longitudinal direction along the hitch drawbar at a vertical step;
        during the stepwise lateral scan, feed the plurality of cropped images into a neural network to detect each cropped image in the plurality of cropped images that includes the hitchball;
        repeat the stepwise lateral scan until a predetermined percentage of the cropped images in the plurality of cropped images that include the hitchball are detected;
        optimize the predetermined percentage of the cropped images in the plurality of cropped images that include the hitchball to enable a voting by the neural network; and
        automatically performing, by the vehicle, a self-parking operation using the voting by the neural network indicating a location of the hitchball.

11. The system of claim 10, wherein the stepwise lateral scan includes a stepwise probability calculation of the region of interest.

12. The system of claim 11, wherein the stepwise probability calculation includes recognizing the cropped images in the plurality of cropped images that include the hitchball by applying artificial intelligence of a known shape of the hitchball.

13. A vehicle, comprising:
    a chassis;
    a rear-facing camera directed at a front of a trailer coupled to the vehicle at a hitchball;

a memory and a processor coupled to the memory, the processor configured to access the memory and execute the computer-executable instructions to:

receive a plurality of image frames from a camera directed at a front of a trailer coupled to a vehicle at a hitchball, wherein the hitchball is attached to the trailer and is no longer visible;

receive data indicating a location of a hitch drawbar coupled to the vehicle and data indicating a lateral location of the hitchball from vehicle manufacturing information, wherein the vehicle manufacturing information is used only for the lateral location of the hitchball;

determine a lateral location of the hitchball coupled to the vehicle based on the data indicating the location of the hitch drawbar;

perform a stepwise lateral scan of only a region of interest based on a template centered at the lateral location of the hitchball from the vehicle manufacturing information, the stepwise lateral scan comprising obtaining a plurality of cropped images in a longitudinal direction along the hitch drawbar;

during the stepwise lateral scan, feed the plurality of cropped images into a neural network to detect each cropped image in the plurality of cropped images that includes the hitchball;

repeat the stepwise lateral scan until a predetermined percentage of the cropped images in the plurality of cropped images that include the hitchball are detected;

optimize the predetermined percentage of the cropped images in the plurality of cropped images that include the hitchball to enable a voting by the neural network; and automatically performing, by the vehicle, a self-parking operation using the voting by the neural network indicating a location of the hitchball.

14. The vehicle of claim 13, wherein the stepwise probability calculation includes recognizing the cropped images in the plurality of cropped images that include the hitchball by applying artificial intelligence of a known shape of the hitchball.

15. The vehicle of claim 13, wherein the processor is configured to execute instructions to perform the stepwise lateral scan of each of the plurality of cropped images along vertical steps including collecting pairs of cropped images, each pair including a positive cropped image that can be increased to any desired number by shifting a crop laterally stepwise including the hitchball and negative cropped images beneath and/or above the positive cropped image with no visible hitchball within a region of interest of any size, wherein the pairs of cropped images are used for training the neural network offline.

* * * * *